United States Patent
Lefebvre

[11] 3,748,828
[45] July 31, 1973

[54] PROCESS AND APPARATUS FOR FLUID-LIQUID CONTACTING

[75] Inventor: Simon Lefebvre, Mons, Belgium

[73] Assignee: Akzo Belge S. A., Bruxelles, Belgium

[22] Filed: Nov. 5, 1971

[21] Appl. No.: 195,913

[30] Foreign Application Priority Data
Nov. 6, 1970 Belgium .............................. 758,570

[52] U.S. Cl. ............................. 55/2, 55/29, 55/70, 55/73, 55/90, 55/93, 55/122, 55/233, 55/240, 55/300, 55/481, 55/527, 261/95, 261/103

[51] Int. Cl. .............................................. B03c 3/16

[58] Field of Search ....................... 55/2, 10, 11, 13, 55/29, 30, 68, 70, 73, 80, 84, 90, 93, 94, 122, 220, 233, 234, 240, 241, 267, 300, 481, 522, 527, 528, DIG. 28; 261/94, 95, 96, 97, 98, 99, 100, 101, 102, 103, 104, 105, 106, 107, 108, 110, 112

[56] References Cited
UNITED STATES PATENTS

| | | | |
|---|---|---|---|
| 1,755,011 | 4/1930 | Ludlam | 55/233 |
| 2,085,155 | 6/1937 | Heidbrink | 55/234 X |
| 2,104,119 | 1/1938 | Forbush | 261/103 |
| 2,314,573 | 3/1943 | Clark et al. | 261/107 X |
| 3,092,096 | 6/1963 | Nett et al. | 126/113 |
| 3,493,219 | 2/1970 | Stahowiak et al. | 261/103 |
| 3,551,674 | 12/1970 | Strindehag | 55/120 X |

Primary Examiner—Dennis E. Talbert, Jr.
Attorney—Leonard W. Sherman, Edwin A. Shalloway et al.

[57] ABSTRACT

A process for fluid-liquid contacting comprising delivering at least one liquid to the end of the series of multifilament threads arranged in at least one bundle so that the liquid flows over the threads as a liquid sheath and passing at least one additional fluid over the liquid sheath so that heat or materials are transferred between the liquid and fluid. Apparatus for trnasferring heat and materials by fluid-liquid contact comprising means for delivering and evacuating a liquid to and from a series of multi-filament threads, means for fastening these multi-filament threads so that they are in contact with the delivering and evacuating means and means for distributing and evacuating a fluid which contacts the liquid, the fluid being the continuous phase.

69 Claims, 28 Drawing Figures

PROCESS AND APPARATUS FOR FLUID-LIQUID CONTACTING

BACKGROUND OF INVENTION

This invention relates to a new process for bringing into contact two or more continuously flowing fluids. More particularly this process relates to a fluid contacting process wherein at least one of the fluids is flowing in the form of a liquid sheath along yarns or threads made up of multiple filaments, set out in the form of one or several bundles in which yarns are separated by a distance allowing liquid sheaths to be individualized in all or most of their run. The invention also relates to a device for use in this process which permits any transfer of matter and heat between fluids.

Liquid-fluid contacting is often used in many industrial processes requiring chemical reactions and substance or heat exchanges between different phases.

Such exchanges are required in physical, chemical or phsico-chemical operations such as: absorption, desorption, condensation, distillation, rectifying, dedusting, precipitation, separation, coagulation, drying, etc.

Methods now using fluid-fluid contacting and especially gas-liquid contacting generally are of two main types:

those using no solid support in the dispersed phase; and those using a solid support in the dispersed phase.

The first type includes systems where gas is injected into a liquid mass in the form of bubbles and systems where the liquid is dispersed in the form of tiny drops within a gaseous stream, for example by means of an atomizer.

In these methods, the flow rate of one phase per unit volume is always low. The power consumption for dispersion of the gases, the delicate behavior of atomizers for dispersing the liquid and of the injectors for dispersing the gas are shortcomings inherent in these processes. The driving of the liquid droplets by the gaseous stream leads to a transfer of low intensity owing to the small value of the relative velocities. The subsequent phase separation requires the installation of additional devices (cyclone seperators, demisters, etc.)

The second type includes packed, tray and wet-walled columns.

Although tray columns are widely used in industrial applications and have been the subject of numerous patented improvements, these columns are expensive to use.

Packed columns use solid elements such as Rashig rings, Pall rings, Berl saddles, Intalox saddles, Spirals, etc., which are expensive as a support over which the liquid flows in order to increase the surface of contact between the liquid and the gas.

These columns also use grate or hurdle piles, fiber tampings, stacked metallic "sieves," etc., to achieve similar results.

In these devices, the mass of the solid support is usually much greater than the mass of the supported liquid. This solid mass and the disordered liquid stream flowing on it create a high pressure drop which impedes the gas flow through the column, causing heavy consumption of energy and major investments in pumps and blowers.

Wet-walled columns, which are used to solve special heat transfer problems, have a small contact surface compared to the overall volume and, have exchange rates having small values per unit time and per unit volume.

Each of these various devices when used in various processes, such as in refining hydrocarbons, separating organic compounds and processing recovered or waste gasses, have the following shortcomings: the high cost of the equipment and accessories; the very great weight of the equipment requiring the building of costly substructures and superstructures; the great height of the equipment requiring great pumping energies, costly thermal insulation, long pipes, etc.; high pressure drop in the gaseous phase causing a high consumption of energy; imperfect knowledge of contact surfaces and exchange or transfer coefficients, often involving wasteful and costly overdimensioning in the preliminary calculations and the consequent problems in optimization; clogging caused by accumulations of particles, sediments or incrustations; difficulty of cleaning supporting elements; and frequent formation of foams and vesicular trailings.

It has been found that by utilizing the process and apparatus of the present invention, the foregoing disadvantages and problems have been obviated. Briefly the process for contacting two or more fluids in order to transfer heat or materials of the present invention comprises delivering at least one fluid to one end series of multi-filamented threads allowing the fluid to pass over the threads as a liquid sheath and passing at least one additional fluid over the liquid sheaths.

DEFINITIONS

Terms used in this specification and claims are defined as follows:

"fluid" refers to any gaseous or liquid fluid, any steam, mist or airborne solid particles, in a pure state, in a mixture, or in any combination with other compounds;

"flowing liquid" it is the liquid continuously flowing (or generally so) along the multi-filamented yarns or threads;

"liquid sheath" it is the configuration of an individual liquid flow around a support made of a yarn with multiple filaments. Sheaths taken together make up the "dispersed phase;"

"continuous phase" it is the fluid brought into contact with the assembly of liquid sheaths supported by a bundle of yarns;

"yarns with multiple filaments" yarn made up of several fibers and/or filaments;

"sheet of yarns" assembly of yarns, which may be parallel or not, situated in the same plane;

"yarn bundle": tridimensional assembly of yarns, which may be parallel or not, formed by several sheets of yarns;

"twisted thread" made of two or more continuous or spun yarns having about the same length and twisted together in one or several operations;

"cabled thread" formed by two or several components, of which at least one is twisted, which components are twisted together in one or several operations;

"assembled thread" made by twisting together several yarns already twisted or cabled.

OBJECTS

It is the primary object of this invention to provide a process for transferring heat or materials without the disadvantages of prior art processes.

It is a further object of the present invention to provide a process for transfering heat or materials by allowing one fluid to flow down a series of filaments or cables.

It is still a further object of the present invention to provide a novel heat and material exchanges wherein one fluid flows along a series of yarns or filaments.

It is still a further object of the present invention to provide a process for gas-liquid transfer wherein the liquid flows as a liquid sheath along yarns.

It is still a further object of the present invention to provide a simple process for fluid-fluid contact which produces a minimum pressure drop.

It is still a further object of the present invention to provide a process and apparatus having easily determinable transfer coefficients.

It is still a further object of the present invention to provide a process and apparatus wherein a liquid is supported and spread out by a series of yarns or cable bundles in order to provide a large contacting surface with favorable transfer properties.

It is still a further object of the present invention to provide for the use of twisted, assembled or cabled threads for preparing bundles of yarns with multiple filaments while retaining all or some of the above-mentioned advantages and avoiding the bursting and dispersing of the liquid sheath caused by the high speed rotation of the liquid sheath.

Still further objects and advantages of the process of the present invention will become more apparant from the following more detailed description.

The process of the present invention comprises delivering a liquid to a series of threads wherein the liquid is supported, spread out, guided and controlled while flowing through a gaseous stream. The support is an extremely light and compact assembly made up of threads or yarns with multiple filaments arranged in one or several well chosen directions and provides a large contact surface as well as favorable transfer conditions.

The process of the present invention for contacting fluids is further characterized by the fact that one of the fluids flows as a liquid sheath along yarns with multiple filaments arranged as one or several bundles and separated from each other by appropriate spacing so that liquid sheaths do not join together at least until near the end of the support.

This invention provides also a simple and economical process for controling the flow rate of a liquid flowing continuously along multi-filamented threads or yarns through another fluid which may or may not contain droplets or particles of liquid or solid materials.

These interactions between the fluid supported on the filaments and the filaments themselves are due to tangential stresses caused by the viscosity of the fluid and allow the control of the characteristics of the liquid flow, i.e., flow rate, speed, diameter, shape, in order to produce laminar or turbulent flow or alternating laminar and turbulent flow. Interfacial liquid-gas and liquid-solid tension may also be varied to obtain the desired flowing characteristics.

The bundle of yarns having multiple filaments may be textile or other wires having multiple filaments which support, guide and control the flow rate of a liquid moving along these yarns in the shape of a continuous or generally continuous sheath. The yarns are arranged as one or several bundles in which they are spaced, in relation to each other, to such an extent that the liquid sheaths maintain their individual character over all or most of the length of the yarns.

Yarns are an assembly of juxtaposed filaments, the number of which may vary from a few filaments to several thousands. There are at least two such elementary filaments in each yarn, which can be arranged in various ways. If they are parallel or slightly twisted, elementary filaments may consist of continuous monofilaments which may be arranged in groups, twisted or assembled to make up yarns with multiple filaments. When using a yarn with multiple filaments made up of discontinuous fibers, good interfibular adhesion must be obtained by conventional means such as twisting, gluing, texturizing, etc.

Suitable yarns having multiple filaments may be produced from one or several yarns having multiple filaments which may be assembled or arranged in groups according to some known techniques such as lapping, twisting, assembling, braiding, etc.

It has been found that the use of twisted, assembled or cabled yarns, causes the liquid sheath flowing on each yarn to acquire a rotating motion which eventually may at certain flow rates, reach a speed fast enough to cause the liquid to leave the yarn.

The rupturing phenomenon is explained by the pressence on the surface of twisted, cabled or assembled threads having a helical groove the depth of which depends on the type of yarn used. The pitch of this groove is related to the twisting used in the course of the various twisting, cabling or assembly operations. The twist given to a twisted yarn, whether cabled or assembled is either in the Z or S direction when the visible windings of a yarn held vertically are slanted as the middle part of Z or S.

Cabled yarns having an individual S twist and cabled with a Z twist produce unitary filaments, flush with the surface, an inclination of which may be chosen at will such as a zero inclination in relation to the axis of the cabled yarn. The inclination of the grooves in the cables is the first parameter governing the characteristics of the liquid flow along these types of yarns.

It has been found that a helical groove induces at least a part of the liquid to flow in it by preference. The flow rate of the liquid therefore comprises a downward axial component and a circumferential component. At certain flow rates and at certain lengths of cable, this circumferential component subjects the liquid to a centrifugal force which increases to the point of the bursting of the liquid sheath, part of which is then scattered into droplets leaving the supporting yarn. If this bursting of the liquid sheath occurs too close to the origin of the flow, the process becomes less efficient and there is the danger that the liquid might be driven into the gaseous phase at the outlet of the apparatus.

The use of twisted yarns, however, either assembled or cabled, produces the following advantages when in the process of the present invention: the homogenization of the liquid, which produces high transfer potential in temperature as well as in composition, due to the rotation which brings the liquid alternately onto the "leading face" and the "trailing face" of the liquid sheath in relation to the gaseous stream, if the latter is transverse to the sheath and furthermore the thorough mixing of the liquid sheath tending to produce uniform temperature and composition at the interface as well as within the liquid sheath; the outside surface of the liquid sheath is not completely smooth but conforms slightly to the shape of the outside surface of the cabled yarns, and promotes gas turbulence around the sheath and, consequently, an increase of transfer coefficients; and the ratio between the surface exposed to the gas and the liquid flow rate is higher than with yarns having more less parallel filaments.

The process of the present invention utilizes for one or more stabilizing yarns added to the twisted threads whether assembled or cabled. The use of one or more stabilizing yarns added to a twisted thread, whether assembled or cabled, inhibits the tendency of the liquid sheath to rotate too quickly, thus causing the rupturing of the sheath and its dispersal into liquid droplets.

Stabilizing yarns may be of any nature, composition, appearance and texture and may have parallel or nearly parallel filaments. The stabilizing yarns may be different from those used as supports, and may be textured or interlaced or may be yarns which have been subjected to some mechanical, physical, chemical, or other treatment. The stabilized yarns may be continuous filaments or filaments obtained from cut fibers.

The stabilizing yarns can be added to the twisted threads whether assembled or cabled in any manner, i.e., by simple juxtaposition so the axes of various yarns remain parallel to each other, or by twisting or lapping one yarn around another.

If the assembly of one or more stabilizing yarns with the twisted threads, whether assembled or cabled, is produced by twisting or lapping, the twist imparted to that assembly should preferably be opposite that of the twisted threads. This twist may be of any value, as long as it is low enough to avoid causing an excessive rotation of the liquid in the same direction as the stabilizing yarns. Since if the given twist is too high, the newly twisted thread will have all above-mentioned drawbacks. The assembling or lapping twist of the twisted threads, and the stabilizing yarns is generally between 0 and 100 turns per meter and preferably between 0 and 25 turns per meter. Furthermore, twisted threads and stabilizing yarns may be chosen in a wide range of sizes and twists. Although the length of the yarns may be chosen with respect to the particular process, generally yarns having a length of from 0.25 to 10 meters are used. A judicious choice of both types of yarn will give a wide range of flow rates and a stable liquid stream adhering well to its filament-like support, which must be chosen in such a way that the liquid sheaths flowing along them will be individualized on all or most of the length of the support.

Filaments with multiple filaments of the type suggested, together with one or more stabilizing twisted threads, may be chosen so as to obtain a stable and individualized liquid sheath on the greater part of the length of the threads with multiple filaments and the subsequent rupturing of the sheath and the dispersal of the liquid sheath into droplets, which may be advantageous in some instances. Filaments of this type combine the advantages of the process of the present invention with the advantages of systems for fluid contacting and for transferring by atomizing one of the fluids.

The choice of threads with multiple filaments as described above will provide the atomization effect if desired by rupturing the liquid sheath and dispersing it into droplets at any point along the thread, preferably at least half the total length of the thread being covered by the flowing liquid. If threads with a useful length of one meter are chose, the rupturing may take place at any point between 0.5 meter and 10 meters from the upper end of threads. These threads which produce the dispersal of the liquid sheath into droplets are obtained by textile manipulations giving sufficient twist or torsion to the twisted threads, and eventually to stabilizing the threads and to the assembly of both of these threads.

In another embodiment of the present invention the rupturing of the liquid sheath may be achieved by eliminating the stabilizing threads on a certain portion of the supporting twisted threads. The dispersal of the liquid sheath in the form of tiny drops may also be induced at the desired point by imparting to the twisted threads to the stabilizing threads and to the assembly of the two types of yarns, different twists at various points along the threads with multiple filaments. This variable twist will produce the revolution of the liquid sheath, the speed of which may vary from one place to the other, thus inducing the rupturing effects in the liquid sheath as specifically designated points.

In addition to the advantages resulting from the homogenization of the liquid produced by the use of twisted threads, another advantage is the cohesion, and the particularly high resistance to breaking imparted by the twisting operations of either assembling or cabling. If rapid gas flows on the order of 5 meters per second are contemplated or if the gas has dispersed solid particles, the risk of individual filaments being torn away by the mechanical forces is smaller with a cabled thread than with a thread having parallel filaments or a thread obtained by a simple twisting.

Suitable threads with multiple filaments may have various textures, such as those which are curled, interwoven or textured for example by false twisting, by passage over a blade, by air blasting or by any other know process. They may also be treated superficially by a mechanical, chemical, physical or electric process so as to change some of their characteristics. These threads may be of different types such as mineral, organic or metallic threads and may be either natural or synthetic.

It is obvious that the choice of the threads with multiple filaments must take into consideration the environmental requirements, i.e., the exchange or transfer conditions between the fluids and the severity of treatment procedures. The threads must be basicly inert with respect to the fluids they guide and support and can be chosen according to their own mechanical, physical and chemical characteristics, such as affinity for certain fluids.

Cellulosic yarns may include natural cotton fibers, regenerated threads obtained with the viscose process such as viscose rayon, discontinuous rayon fibers, high module fibers of the Polynosic type and threads containing cellulosic derivatives such as cellulose acetate, cellulose acetate esters, etc.

Synthetic wires may include those produced from polyamides, acrylics, polyesters, polyvinyls and polyolefines such as polyethylene and polypropylene and threads produced other organic compounds, such as polytetrafluoroethylene, etc.

Mineral yarns include threads made from glass, carbon ceramic materials, etc. Fibers and filaments used as strands for the preparation of yarns making up the bundles of threads with multiple filaments, are obtained through well known procedures involving chemical spinning or melt spinning or by the use of other techniques such as the fibrillation of films.

Metallic wires include platinum, tungsten, gold, nickel alloy, stainless steel, etc. These yarns may be of different gauges and qualities, and may be a standard type with average or high strength or they may have special properties.

These filaments may also be formed from one or more components and may have various cross-sectional shapes such as round, sheathed, hollow, etc.

Yarns with a high thermal resistance are particularly useful for fluid-fluid contacting requiring high temperatures for the exchange and transfer of heat and materials. Such heat resistant materials include synthetic products, such as methaphenylene isopthalmide filaments or alternatively, of fibers sold under the name Nomex or made with other aromatic polyamides or any thermostable polymer.

This invention provides that at least one of the fluids must flow in the form of a liquid sheath along threads with multiple strands. The three dimensional assemblies of threads with multiple filaments which constitute a bundle are arranged in such a way that the gravity flow along each thread will be generally continuous. Therefore, the threads must be far enough apart from each other so that over all or most of the fluid run, the individuality of every liquid sheath flowing along the threads will be retained. Preferably such distances must be uniform but other arrangements are not excluded by this invention. For example, the bundles of threads with multiple filaments may consist of several assemblies of equidistant, vertical and parallel yarns. They may be formed with parallel yarns regularly spaced so as to constitute sheets of threads the width and the length of which would be related to the dimensions of the apparatus used.

These yarns must be kept apart and must be fed with liquid by adequate means, such as, assemblies of parallel yarns held at their lower and upper ends by attachment in or on a plastic mass, metal, glass, ceramic or other material and fed with liquid from a liquid dispenser.

According to another embodiment of the present invention, some of the yarns or certain parts of them may be inclined but the degree of inclination must not generally exceed a certain value which would disrupt the continuous flowing of the fluid along the threads with multiple filaments. Also, yarns need not be parallel with each other but may be slanted with relation to each other, either in the same plane or in different planes. Therefore with a judicious choice of the arrangement and inclination of yarn bundles local contacts between the bundles can be produced in preselected locations so as to bring about exchanges between liquid sheaths of different natures or concentrations. These contacts between yarns at a certain point along their length allow liquid sheaths formed by the first flowing liquid to receive an additional flow from another liquid. In this case, liquid sheaths will retain their individualities on most of their runs along the threads with multiple filaments. This arrangement could be described by the letter Y. The upper branches of this letter represent two indivdualized sheaths which merge into one sheath at the junction point with the lower part of the Y.

Also with sudden directional changes in the threads, it is possible to effect the rupturing of the liquid sheath which will then leave the support yarns. Such as the case described by the letter V, wherein liquid sheaths flow along the two branches of the V and leave their supports at the lower junction point of the V.

According to this invention, any arrangement is possible so long as the individual flows along each thread with multiple filaments constituting the thread bundle remain continuous in all or most of their runs. The yarns constituting the bundle may initially be installed without tension. Subsequently, however, they may be tightened or left in a loose state depending on the conditions of the liquid flow, of the continuous phase flow and of the establishment of contact between fluids which govern, among other things, the tightness or lack of tightness of yarns. It is obvious that if treatment fluids have a shrinking effect on the yarns making up the thread bundles, it will be necessary to install the threads on the apparatus in a loose state, taking into account the degree of shrinking expected. On the other hand, if fluids bring about the stretching of yarns, the latter will have to be installed tightly on the apparatus, or certain devices like weights, deformable elements, etc., may be used to compensate for the stretching expected. The tightness given to threads with multiple filaments may be increased if the velocity of the second fluid is such that it might bring about a contact between yarns which would change the individuality and the characteristics of the continuous flow. The tightness also effects the degree of compactness of the multiple filaments constituting the yarns and it is, therefore, a variable effecting on the flow. According to a preferred embodiment of this invention, the yarns should be kept tight.

According to this invention at least one of the fluids flows in the shape of a liquid sheath along a bundle of yarns with multiple filaments. The diameter of this sheath could vary from about 0.2 to about 10 millimeters. This diameter and the liquid flow rate corresponding to it are practically the same on all yarns if feeding and flowing conditions are identical on every yarn. This continuous flow with an identical value on each yarn is a definite advantage for design, control and operation of the apparatus for bringing fluids into contact.

There are many variables which effect the multifilamented threads and which held control the flow characteristics such as: the nature of the material constituting the thread; the diameter of each strand; the number of strands constituting each thread with multiple filaments or the number of threads assembled in one way or another to form a multi-filamented yarn; the nature of treatments of the filaments, the yarn with multiple filaments or the assembled threads making up the yarn with multiple filaments; the degree of tightness given to the yarns with multiple filaments; the angle of inclination of the yarns in relation to the vertical axis; the possible arrangement of any type of reliefs set up periodically or not on the yarns; and the spatial arrangement of the yarns making up the bundle of threads with multiple filaments.

Local variations which may be located on the threads may induce or control the turbulence or the renewing of contact surfaces. For example, licker-ins or other devices may be arranged in various ways in the apparatus so as to disturb the flow locally while keeping it continuous. Knots and other contrasts may be provided along the threads for the same purpose. Threads could also be vibrated in order to improve transfer conditions with an increased turbulence in the continuous phase. Electric fields may be established between liquid sheaths and any other surface. Heating elements or thermal vectors such as yarns crossed by electricity or thin tubes crossed by coolant fluids may be incorporated in or juxtaposed to the multi-filamented threads to meet the heating or cooling requirements of specific transfers.

Among the many parameters of the apparatus which maybe varies include the following: design and dimensioning of openings for liquid distribution; the height or pressure of the flowing liquid at the distributor; the choice of relative directions for the two fluids to be brought into contact: cross-currents, parallel cocurrents, parallel counter-currents, fractional currents and currents directed by baffle plates; the choice of relative directions and locations of various thread bundles if several are used; and the ratio of the three main dimensions of the contractor: height, length, and width.

The apparatus of the present invention for fluid-fluid contact wherein at least one of which flows as a liquid sheath along yarn with multiple filaments, arranged in the form of one or several bundles, includes a device or a "contactor" of any shape which is characterized by: means of distributing the liquid; means for fastening the upper ends of yarns with multiple filaments in contact with the distributing means for distributing and discharging the continuous phase; means for discharging the flowing liquid; and means for fastening the lower ends of multi-filamented threads.

The term "contactor" is used in a general sense. It refers to any device where dispersed and continuous phases are brought together according to the process of this invention. Its cross-section may be square, rectangular, circular, elliptical, polygonal, etc.

One of the advantages of this process is that the contacting device may be easily given the proportions best suited to the desired process. For example, if the cross-current arrangement is chosen and if the objective is the thorough scrubbing of a gas under conditions of high resistance to the transfer of matter, it will be necessary to use a relatively short liquid flow with a very long run in the gaseous phase in a bundle having many supporting threads in the direction of this run. If, on the other hand, in a cross-current arrangement, the objective is to significantly modify the content of a solute with poor solubility in a liquid, either by absorption or desorption, relatively long liquid runs will usually be required. Moreover, the thread bundle device is especially convenient for operations in series, in parallel or any series-parallel arrangement of several contractors. This feature makes it possible to achieve the best distribution of the driving force in relation to the desired goal and to optimize the process.

The means for distributing liquids may include a distribution compartment connected with the device used to fasten the upper ends of the threads with multiple filaments. This compartment may consist in part of the device fastening the upper ends of the yarn. If this device is made up of plastic strips holding the multi-filamented threads, an assembly of these strips may constitute one of the walls, which may be either continuous or discontinuous, of the distribution compartment.

Devices used for feeding and discharge in the continuous phase are chosen from conventional devices and must be selected in relation to the arrangements adopted for fluid contacting i.e., cross current flow, parallel co-current flow, parallel counter-current flow, fractional flow, flows directed by baffle plates, etc. In the case of cross-current flows, the flow directions may be perpendicular or may form an angle other than 90°.

According to a preferred embodiement of this invention, the fluid constituting the continuous phase is either blown or pumped crosswise with relation to the bundles of yarns having multiple filaments. Because of the very low pressure drop in the gas, it is possible, in some cases, to make the gas move by simple natural draught which is caused when gases are ejected by a stack such as scrubbing of waste gases or when atmospheric air is moved as in oxygenators, water evaporators, etc.

The discharge device or "collector" of the flowing liquid is combined with the device fastening the lower ends of multi-filamented yarns or threads. The discharge means and means for fastening the lower end of the filaments may be similar to the distribution and fastening means.

According to one embodiment of this invention, sheets of threads with multiple filaments may be formed from parallel yarns regularly spaced with their ends fastened to plastic strips. These strips on which thread sheets are fastened, are arranged horizontally in the apparatus. The upper strips are placed in an upper compartment which is fed with liquid whereas the lower strips are placed in a lower compartment designed to ensure the discharge of the flowing liquid. These strips may be made from any suitable material. However, when choosing strip material it is important to avoid or limit corrosion, swelling or any other effect which might damage the apparatus. The choice of the shapes and dimensions of the strips and insert elements is dictated by the need to limit their deformation by the yarns under stress.

The assembly of strips called "fastening plate" may be designed to allow the liquid to reach the threads having multiple filaments in the upper part of the bundle and to be discharged into the collecting compartment located in the lower part of the bundle. This may be achieved in the following ways: strips having regularly spaced channels between them which will allow a continuous flow of liquid from the distributing compartment to the sheets of threads and its distribution on them; the use of insert plates ensuring flowing channels for the liquid between the strips; the use of insert plates and/or strips having a communicating porosity, and the incorporation at the yarn ends of porous or capillary elements permitting the passage of the liquid. The flowing liquid may also be brought to the yarns under the fastening plate by any means such as: projection by injectors, distribution by tubes or channels of any type.

The apparatus also comprises a compartment for distributing the fluid in the continuous phase i.e., as a gas and a gas outlet compartment, so that the fluid currents cross each other perpendicularly. The upper compartment is continuously fed with a liquid which when contacting the upper ends of the multi-filamented threads, flows continuously along these yarns forming the liquid sheaths. The assembly of the liquid sheaths thus formed achieves an excellent contact between the liquid and the other fluid, for example, a gas flowing transversely across the sheaths.

Although the fluid in the continuous phase is preferably a gas, other liquids may be used when interfacial tension conditions and specific weight differences allow it, as well as, vapors, mists or gases containing solid particles.

DESCRIPTION OF THE DRAWINGS

The process and the apparatus for fluids contacting two or more will be better understood with reference to the following figures which in no way limit the scope of this invention, wherein like elements have the same designation:

As shown in FIG. 1, a sheet of threads with multiple filaments 1 which are parallel to each other and regularly spaced is embedded in its upper and lower parts in an upper strip 2 and a lower strip 2" made from a synthetic resin.

FIG. 2 is similar to FIG. 1 but shows non-parallel multi-filamented threads which may be suitable for an apparatus in the form of a truncated cone or with a trapezoidal cross section.

In FIGS. 3 and 4, threads 1 with multiple filaments are regularly spaced with square and staggered arrangements.

In FIG. 5 distances between the multi-filamented threads 1 are variable and arranged along cylindrical surfaces.

FIG. 6 shows a plane view of a fastening plate which comprising a number of strips 2 to which the ends 1' of multi-filamented threads or wires have been attached. These strips are arranged side by side and they are held in this position by pressure, adhesion or any other means. Together they constitute a fastening plate. Inserts 7 allow the liquid to flow through the fastening plate and to reach the threads 1.

FIG. 7 shows an assembly comprising a synthetic resin fastening upper plate to which multi-filamented yarns 1 are attached, and a compartment 4 for distributing the flowing liquid brought in by pipe 5. The joint 3 ensures tightness between the fastening plate, formed by the strips 2 and inserts 7 and the distribution compartment 4.

FIG. 8 shows an insert 7' with cuts 8 the depth of which is slightly greater than the height of fastening strips 2 so as to enable the liquid to flow towards the threads or yarns 1. The purpose of the inserts 7' is: to transmit through their solid parts the strip assembly pressure; to permit the passage of the liquid through the cuts, from the upper part of strips 2 to the thread bundles 1; and to distribute the flowing liquid to yarn 1.

Figure 8:
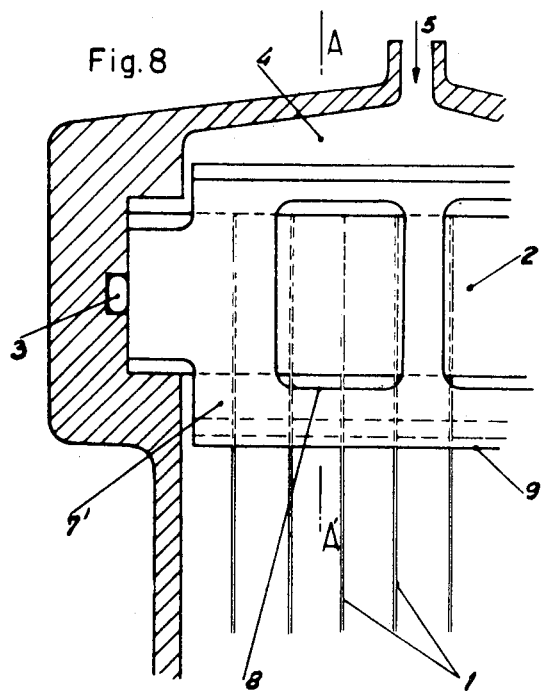
FIGS. 8 to 11, 12 to 15 and 16 to 19 show in plane and side views other designs for the fastening plate.
Figure 9:
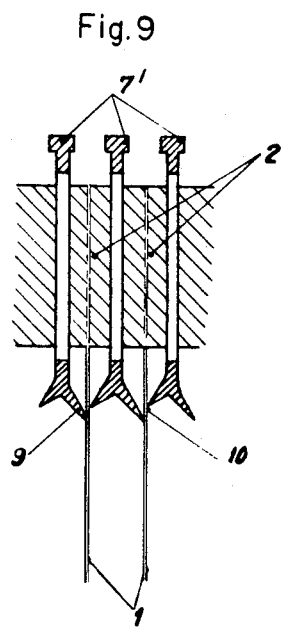

According to FIG. 9, which is the cross section of an element of FIG. 8 along the axis AA', fastening strips 2 are separated by inserts 7' which provide channels for the liquid to flow between the fastening strips. As can be seen in FIGS. 8 and 9, the inserts 7 are structured at their lower ends 9 so as to form a contact area 10 between the yarns 1 and the flowing liquid.

Figure 10:
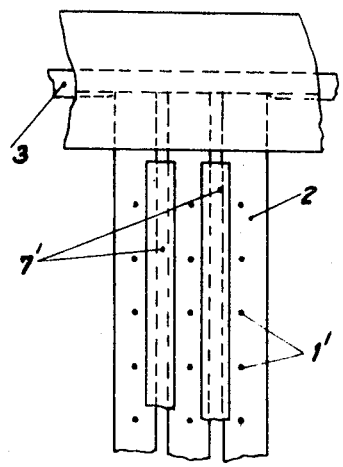

FIG. 10 is a plane view of the upper fastening plate corresponding to FIG. 8. It shows the arrangement of the fastening strips 2 yarn ends 1' and inserts 7.

Figure 11:
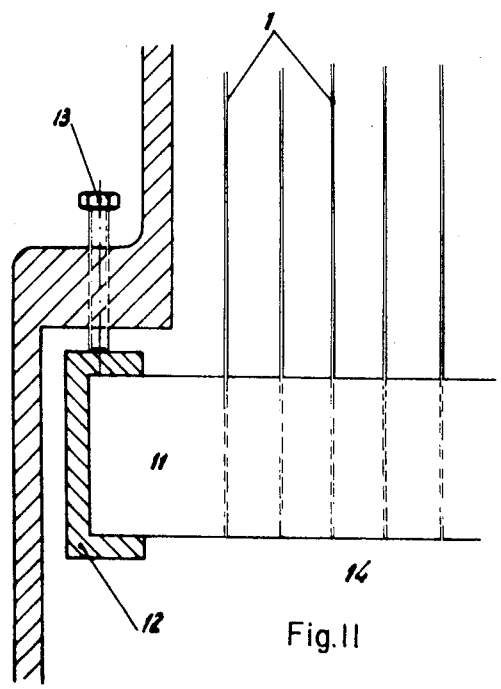

FIG. 11 shows a lower strip 11 and one of the ways to put a bundle or multi-filamented threads of yarns 1 under tension, using the ends of the lower strips 11 which engage in a U-shaped part 12. The bolts 13 permit the adjustment of part 12 so that the bundle of yarns 1 may be tightened at will. The space 14 located under strips 11 is part of the compartment (not shown) where the liquid is collected. It is to be noted that the lower strips 11 do not necessarily have to be provided with special inserts such as those shown in FIG. 9 as 7'. The liquid flow at the outlet of the thread bundle should not, in fact, be controlled, guided and distributed as it is in the upper part of this bundle. A simple and regular spacing of the lower strips can therefore be achieved by known means.

Figure 12:
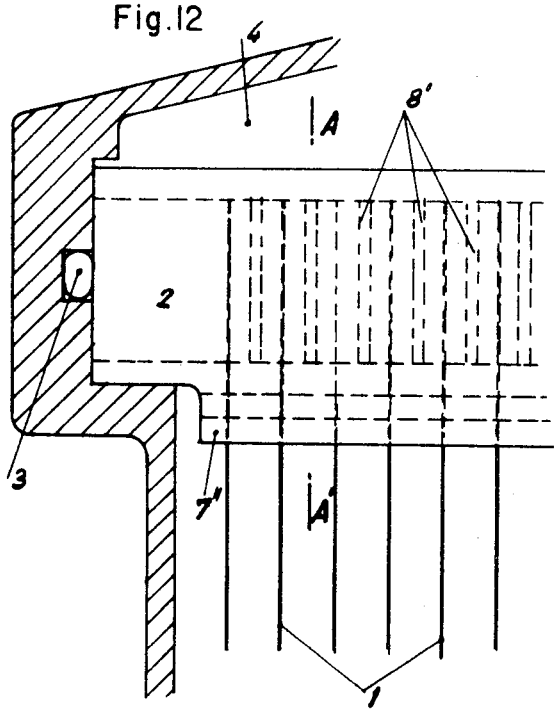

FIG. 12 shows strips 2 provided with vertical grooves 8' which allow the liquid to go through the upper fastening plate.

Figure 13:
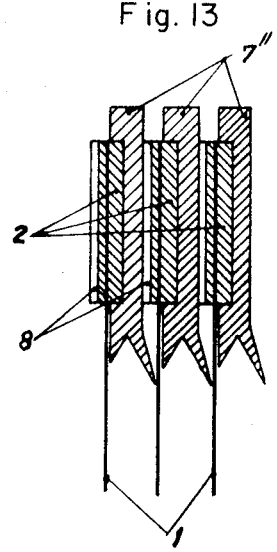

FIG. 13, which is a cross section corresponding to AA' in FIG. 12, shows that strips may also be fitted in the inserts 7" so as to benefit from their rigidity.

Figure 14:
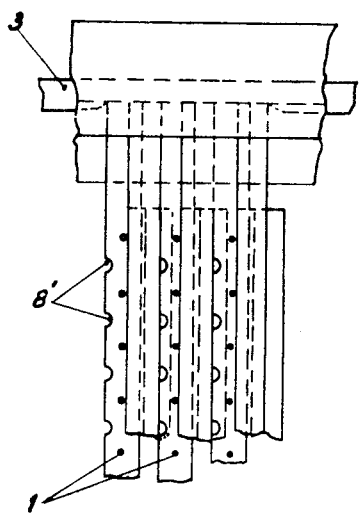

FIG. 14, which is a plane view of the upper fastening plate corresponding to FIG. 13, shows an example of an arrangement for grooves 8' and yarns 1.

Figure 15:
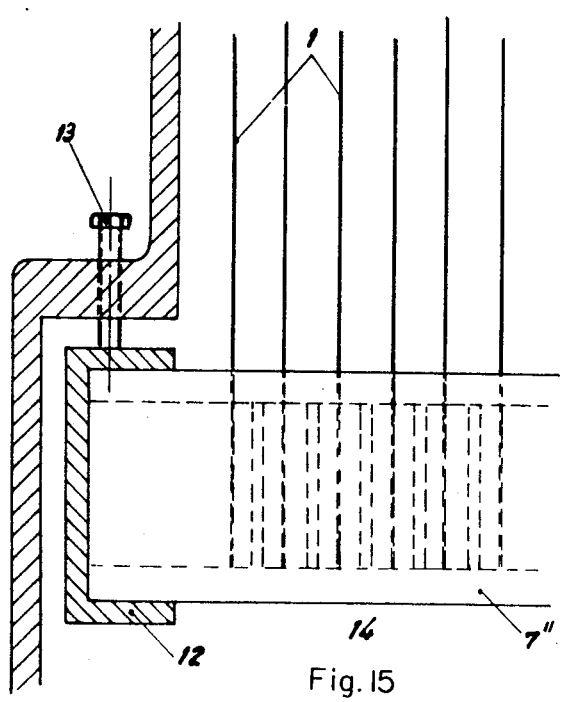

FIG. 15 shows one way of fastening the lower strips and inserts so as to benefit from the placing of strips into rigid inserts 7" in order to subject yarns 1 to great stresses without bending the lower fastening strip.

Figure 16:
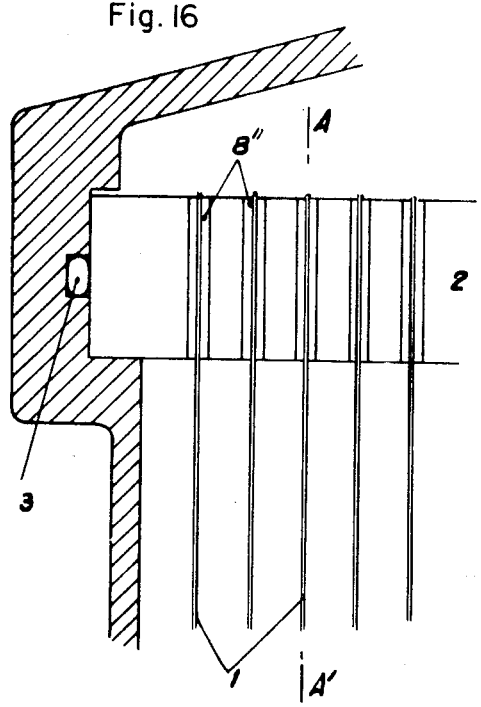

FIG. 16 shows the construction of a bundle of yarn 1 with strips 2 provided with grooves 8" without using inserts. The strips, in this case metallic, are sufficiently rigid to sustain the stress of the yarn bundle without excessive bending.

Figure 17:
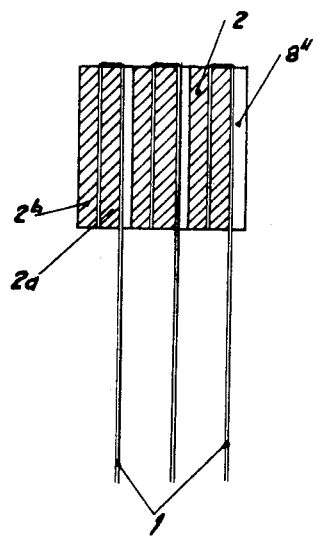

FIG. 17 which is a cross section corresponding to AA' in FIG. 16 shows that the yarns 1 are fastened between two half strips 2a and 2b by glue, adhesive tape or other means. The fold formed by the yarn around the strip facilitates the performance of the fastening element.

Figure 18:
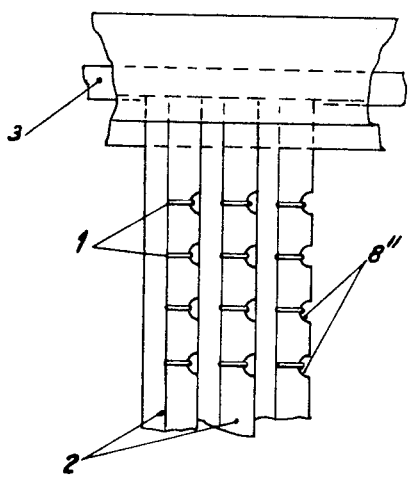

FIG. 18, which is a plane view of the upper fastening plate, shows the arrangement of yarns 1 and grooves 8".

Figure 19:
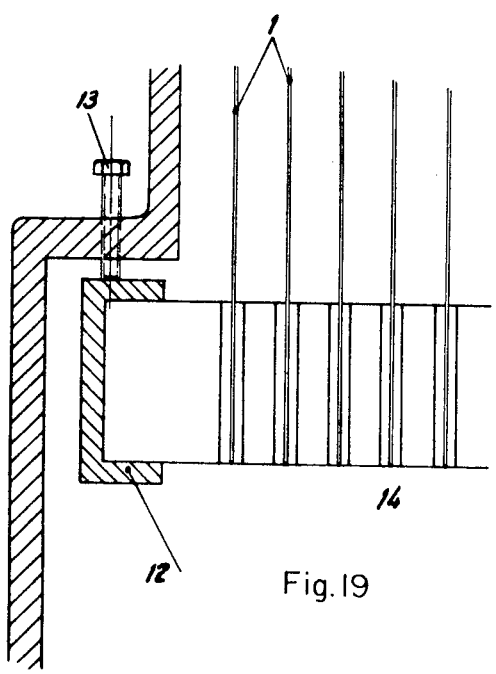

FIG. 19 shows how the lower strips may be fastened and how the yarns can be put under stress.

Figure 20:
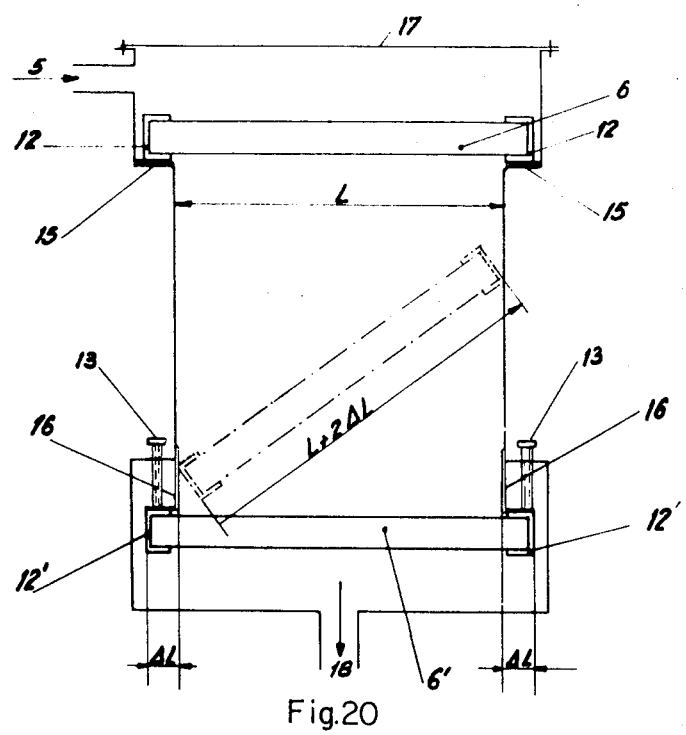
FIGS. 20 to 28 show various types of apparatus for bringing fluids into contact according to the present invention.

FIG. 20 is a diagramatic view of a yarn bundle contactor. The placing in the apparatus of the bundle of preassembled yarns by fastening the ends of strips in the U-shapped parts 12 and 12' in the form of fastening plates 6 and 6' can be achieved in various ways depending on technical or economic requirements.

If the apparatus can be opened by its front face, shown in the drawing, the upper and lower fastening plates can be slid from front to rear, while parts 12 of upper plate 6 rest on the edges 15 of the upper compartment. When the bundle is in position, L-shaped parts 16, which can slide vertically, are tightened by bolts 13. If it is more convenient to reach the apparatus through its upper wall, the latter must be designed as a removal lid 17.

The pre-assembled bundle, made up of lower and upper strips jointed by structured parts 12 and 12', is lowered into the apparatus with the plates slanted as shown by the position of lower plate 2 drawn in dotted lines. In this way it is possible to install in an apparatus the width of which is L a lower fastening plate the width of which is L + 2 Δ L, Δ L being the width necessary to place the lower plate against the parts 16 which allow it to put the bundle under stress.

When the stress is high it cannot be supported by the walls of the apparatus. The bolts 13 are then prolonged by vertical rods which transfer the thrust directly on the parts 15 and on the upper fastening plate. The stress is therefore sustained by very simple parts which are located outside the space where fluids flow.

Figure 21:
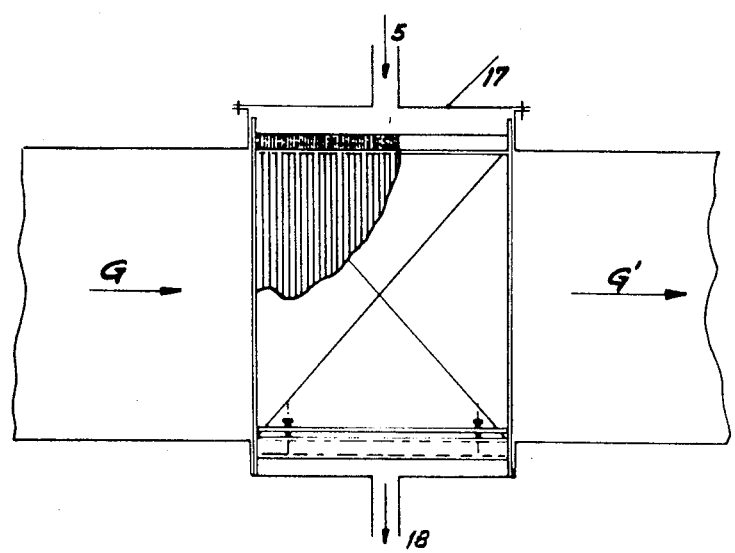

FIG. 21 shows how a thread bundle contactor may be inserted in a pipe carrying a gas in the GG' direction. The flowing liquid is introduced by pipe 5 and carried away by pipe 18. Should it become necessary to remove the bundle and replace it by another this can easily be done by removing the lid 17 according to the technique described in the comments on FIG. 20.

Figure 22:
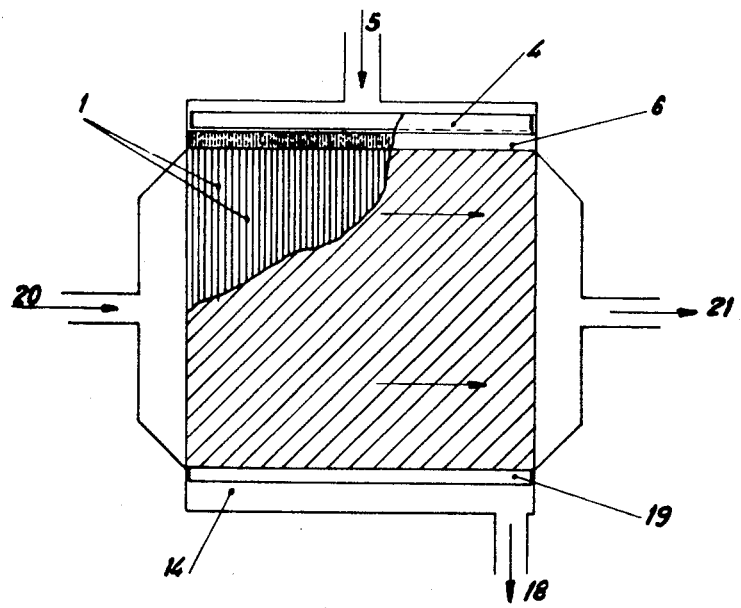

FIG. 22 shows the apparatus used to establish contact between fluids of which one, at least, is flowing in the form of a liquid sheath along a bundle of multi-filamented threads or yarns. This device called a "contactor" comprises a liquid dispenser 4 attached to the upper fastening plate 6 which holds the upper ends of multi-filamented yarns 1. The lower ends of these yarns are held in the lower fastening plate 19 which is linked to the liquid collecting compartment 14 whence the liquid is drained by pipe 18. The fluid in the continuous phase is brought in by pipe 20. After having been in contact with the liquid sheaths flowing along multi-filamented yarns, this fluid is carried away by pipe 21. According to FIG. 22, the liquid which is brought in by pipe 5 feeds the liquid distribution compartment 4. As it is in contact with the upper ends of the multi-filamented yarns, this compartment distributes to each yarn a specific quantity of liquid. The liquid flows continuously by gravity along the yarns 1 so as to form a liquid sheath along each multi-filamented yarn. The fluid making up the continuous phase, in this case a gas, is brought in by pipe 20 and transversely flows over the various liquid sheaths flowing along the multi-filamented yarns 1.

Figure 23:
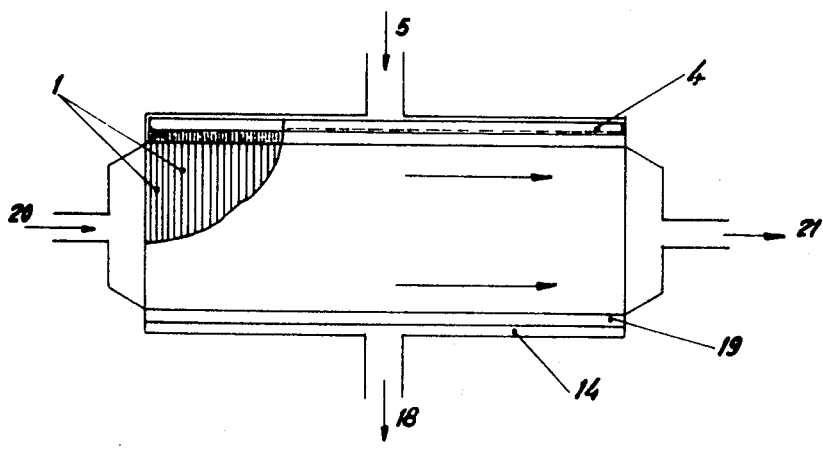

FIG. 23 represents an apparatus in the form of an "horizontal contactor," comprising a liquid dispenser 4 and a liquid collector 14. The bundles of multi-filamented yarns 1 are short compared to the length of the contactor. This arrangement would be particularly suitable for thorough scrubbing of gases, for complete dedusting and demisting and for making gas "loadings" by evaporation, etc.

Figure 24:
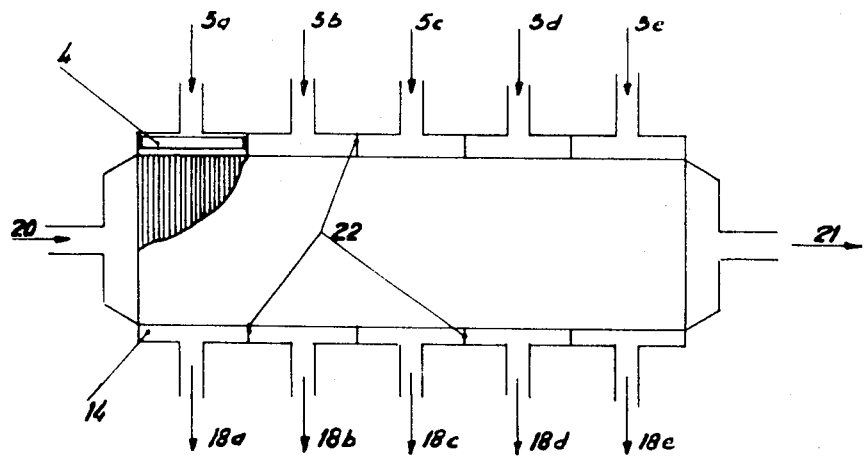

FIG. 24 shows a contactor of the same type as the one shown in FIG. 23. However, a simple partioning 22 of the liquid distribution compartment 4 and of the collector 14 makes it possible to distribute various liquids on the gas flow — a gas blown in by pipe 20 and drained by pipe 21 — for example, solutions with different concentrations brought in by pipes 5a, 5b, 5c, 5d and 5e and carried-away by pipes 18a, 18b, 18c, 18d and 18e.

Figure 25:
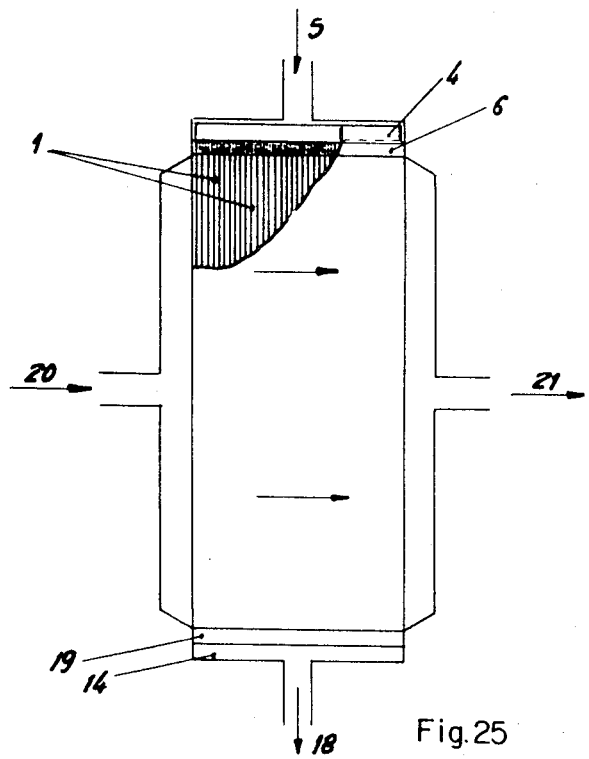

In FIG. 25, the "contactor" is of the vertical type and as in FIGS. 22, 23 and 24, the fluid currents intersect perpendicularly. This type of apparatus is particularly suitable for making transfers of which the main object is to modify appreciably the composition of liquids, for example, when it is desired to achieve desorption or the absorption of difficultly soluble compounds.

Figure 26:
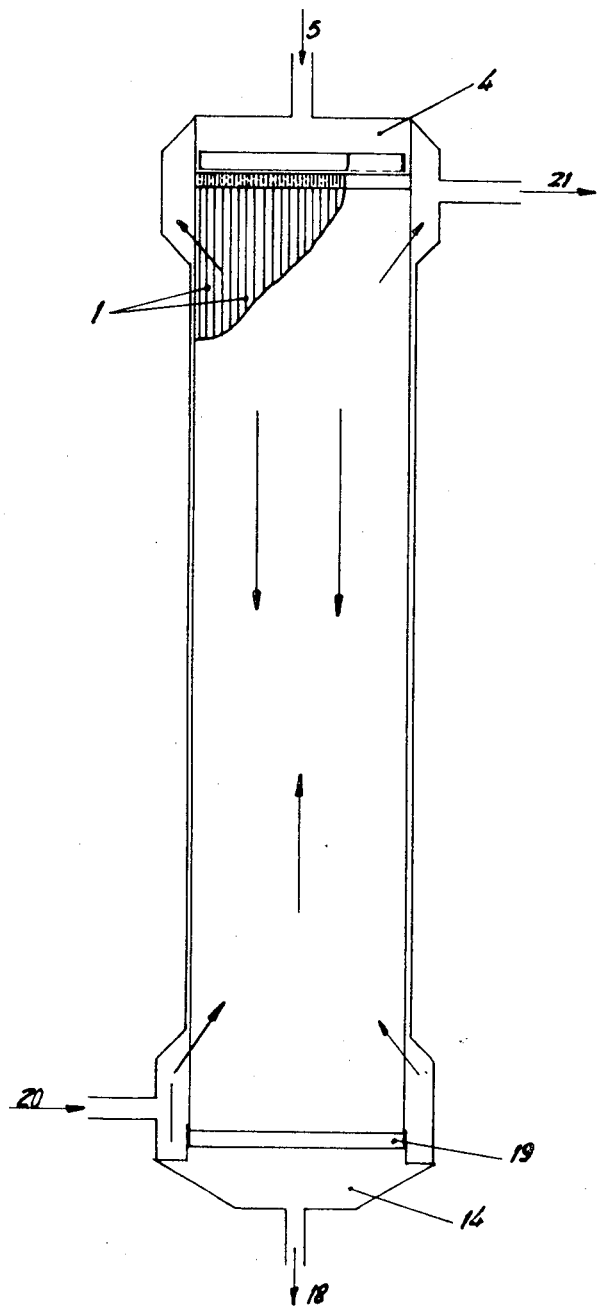

FIG. 26 shows a "contactor" in which fluids are flowing parallel to each other in the form of counter-currents. The continuous phase fluid is brought to the base of the contactor by pipe 20 and enters into contact with the liquid sheaths that are flowing along multi-filamented yarns 1 before being drained by pipe 21. This parallel current device is less effective than cross-current devices in promoting continuous phase turbulence but in some cases it gives a better distribution of driving forces which may be an advantage.

Figure 1:
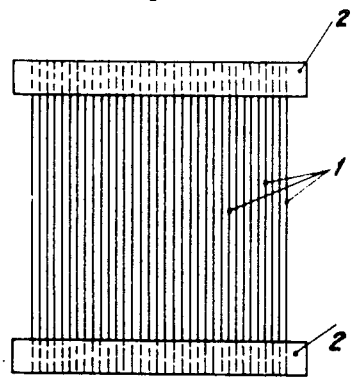
FIGS. 1 and 2 show a side elevation of a sheet of threads with multiple filaments complete with fastening strips.
Figure 2:
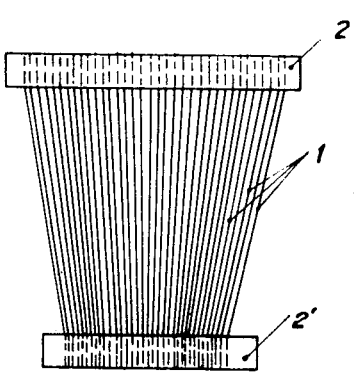
Figure 3:
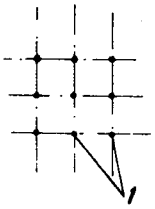
FIGS. 3, 4 and 5 are plane views of various arrangements for multi-filamented threads.
Figure 4:
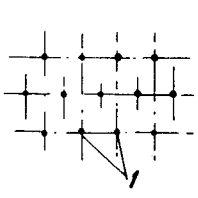
Figure 5:
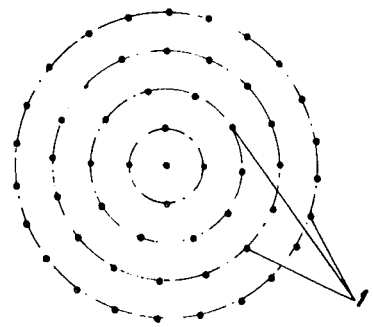
Figure 6:
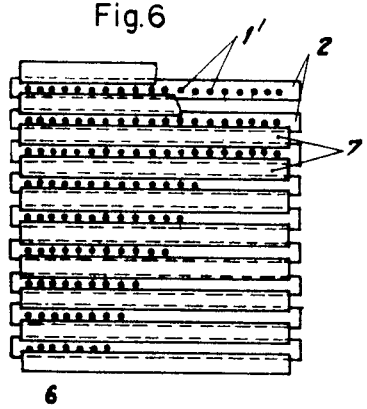
FIG. 6 is the plane view, partially cut away, of a fastening plate with multi-filamented threads.
Figure 7:
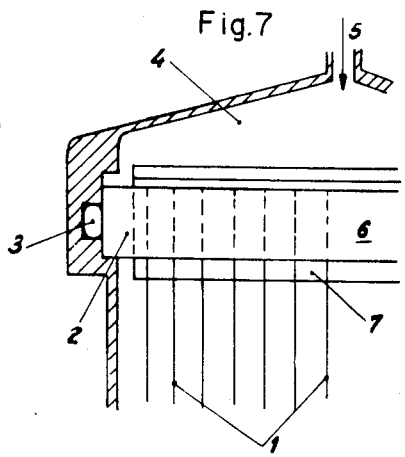
FIG. 7 is a diagramatic side view of a bundle of multi-filamented threads, with upper fastening plate, flowing liquid inlet compartment and leakproof joint.

According to FIGS. 22, 23, 24, 25 and 26, the cross-section of the apparatus may be square, rectangular, circular or of another shape. The square and rectangular cross-sections are particularly advantageous at pressures close to the atmospheric pressure and are particularly suitable for assemblies of bundles of multi-filamented wires as shown in FIG. 1. At very low or very high pressures, cylindrical contactors may be more appropriate.

Figure 27:
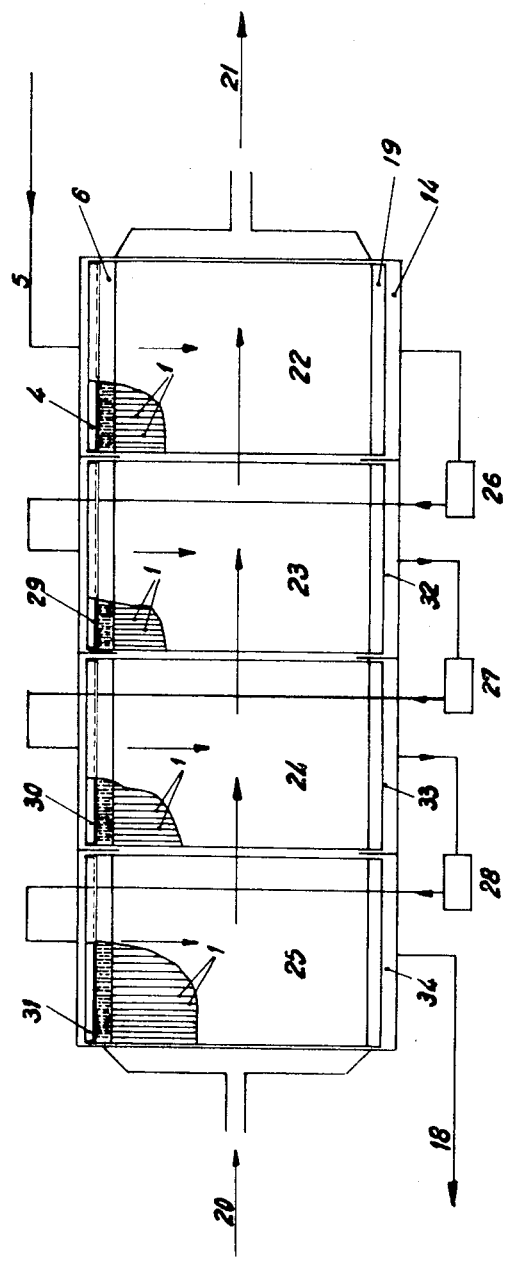

FIG. 27 shows contactors 22, 23, 24 and 25 in series. These contactors are of the type shown in FIG. 22, The flowing liquid is brought by pipe 5 into the liquid distribuiton compartment 4 of contactor 22. This compartment is in contact with the upper fastening plate 6 to which the upper ends of the multi-filamented yarn bundles 1 are secured. The liquid is flowing by gravity in the form of a liquid sheath along the threads 1 and it is gathered into the collecting compartment 14 which is in contact with the lower fastening plate 19. The liquid is pumped successively into contactors 23, 24, and 25 by pumps 26, 27 and 28. It is then returned to the following distribution compartments: 29, 30 and 31 and carried away by the various liquid collecting compartments 32, 33 and 34 and finally expelled through pipe 16.

The continuous phase fluid is blown crosswise by pipe 20 through a fan (not shown). The gas blows across the various multi-filamented yarn bundles contained in contactors 25, 24, 23 and 22 and is carried away by pipe 21. This arrangement of contactors in series is particularly suitable for thorough scrubbing and dedusting. It can also be used as a gas saturator, a coolant, etc.

Figure 28:
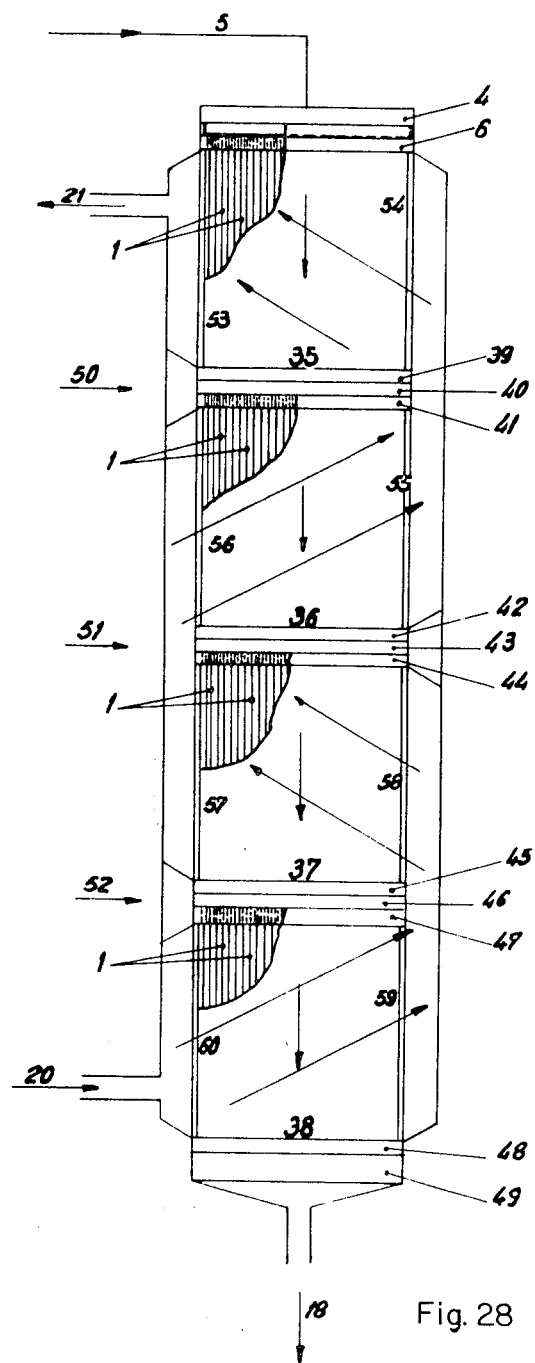

FIG. 28 shows a series of contacting elements 35, 36, 37 and 38, superposed vertically. The liquid is moving by simple gravity from one element to the next. The flowing liquid is delivered through pipe 5 into the distribution compartment 4. It crosses the fastening plate 6 to which the upper ends of the multi-filamented yarns are secured. The liquid then flows along these yarns in the form of liquid sheaths and, having crossed the lower plate 39, is gathered in the collecting compartment 40 which is in contact with the fastening plate 41 holding the upper ends of yarns 1 of the second contactor 36. The liquid thus flows uninterruptedly from one contactor to the next, passing through the various plates and compartments 39 to 49. These compartments act as liquid collectors for the element located above them and as liquid dispensers for the element below. Finally, the liquid is carried away by pipe 18. The continuous phase fluid is blown in by a fan (not shown) through pipe 20 which is located at the bottom of contactor 38. This fluid, which is generally gaseous, is blown from bottom upwards and crosses inlet and outlet faces 60, 59, 58, 57, 56, 55, 54 and 53 of various contactors 38, 37, 36 and 35 to be finally removed by pipe 21. Heat exchangers, clarifiers or feeding devices may be installed in levels 50, 51 and 52 of liquid collectors 40, 43 and 46.

A vertical arrangement such as this may be suitable for certain rectifications, for absorptions and desorptions when transfers to be made are slow, massive, etc. Arrangements in series, in parallel or in parallel series may be obtained with unitary elements of any type.

EXAMPLES

The application of this invention will be further illustrated by way of the following more specific examples which are for illustration only and not to be considered as restrictive.

Examples 1 to 7 are directed to the preparation of bundles of multi-filamented threads and they show explicitly the unexpected results obtained by adding one or several stabilizing yarns to a supporting yarn chosen from cabled, twisted or assembled yarns.

Examples 8 to 12 are directed to the application of the process and the device of the present invention for contacting two or more fluids and for transferring matter and heat between them.

EXAMPLE 1

The multi-filamented yarns are made from a supporting cabled thread made from polyhexamethylene adipamide obtained by retwisting four pieces of thread having 940 dtex with an S twist of 250 t/meter followed by cabling 3 of the twists thus obtained with a Z twist of 125 t/meter and a stabilizing thread made of polyhexamethylene adipamide obtained by retwisting two pieces of 235 dtex with a S twist of 800 t/meter, followed by cabling 3 of the twists thus obtained with a Z twist of 400 t/meter, are twisted together by S twisting of 5 t/meter.

Water flow tests were made on samples of threads, measuring 1.5 meter and stressed by a load of 60 grams at various flow rates of demineralized water, varying from 10 ml/min to 110 ml/min. The results of these tests are shown in Table 1.

It is to be noted that the lack of stabilizing yarns in the multi-filamented threads causes the liquid sheath to rupture early even if the flow rate is small. The addition of a stabilizing yarn to the twist used as support makes it possible to obtain an individualized and stable flow over the entire path length, even when flow rates are relatively high, in the order of 75 and 110 ml/min.

In Table 1 the term "flow pulsation" means the phenomenon whereby beads are formed which are superimposed on the normal liquid sheath.

TABLE 1

| Flow rate ml/min | Flow without stabilizing yarns | Flow with stabilizing yarns |
|---|---|---|
| 10 | very good | very good |
| 15 | good on 300 mm, then rotation and vibration of the liquid sheath and projection of drops | very good |
| 60 | good on 200 mm, then rotation and vibration of the liquid sheath and projection of drops | very good |
| 75 | poor | very good |
| 110 | poor | first flow pulsations |

EXAMPLE 2

A support cable of polyhexamethylene adipamide obtained by twisting six threads of 940 dtex with an S-twist of 250 t/m followed by cabling three of these filaments with a Z-twist of 125 t/m and a stabilizing yarn as used in Example 1 are assembled by twisting with an S-twist of 10 t/m.

Table 2 gives the results of tests made with various flow rates of demineralized water varying from 15 ml/min to 120 ml/min under conditions similar to that in Example 1.

The addition of a stabilizing yarn to the cabled thread making up the supporting yarn makes it possible to obtain a steady flow over the entire path length whatever the flow rate chosen. Without a stabilizing yarn, the flow will quickly break up, even at relatively small rates in the order of 30 ml/min.

TABLE 2

| Flow rate ml/min | Flow without stabilizing yarns | Flow with stabilizing yarns |
|---|---|---|
| 15 | very good | very good |
| 30 | good on 300 mm, then rotation and vibration of liquid sheath with dispersion of droplets | very good |
| 50 | good on 250 mm, then rotation and vibration of liquid sheath with dispersion of droplets | very good |
| 80 | good on 150 mm, then rotation and vibration of liquid sheath with dispersion of droplets | very good |
| 120 | poor | quite good flow but first pulsations |

EXAMPLE 3

The supporting wire which is an assembly of nine filaments of 1040 den polycaprolactam with a Z-twist of 220 t/m and the stabilizing yarn, which is cabled polyhexamethylene adipamide by assembling two 210 dtex filaments having an S-twist of 800 t/m and cabling three of the assembled filaments with a Z-twist of 400 t/m are linked by retwisting with an S-twist of 10 turns per meter. Tests similar to those of Example 1 are conducted and the results listed in Table 3.

TABLE 3

| Flow rate ml/min | Flow without stabilizing yarns | Flow with stabilizing yarns |
|---|---|---|
| 16 | very good | very good |
| 27 | very good | very good |
| 48 | good | very good |
| 76 | good flow on 460 mm, then rotation and spattering of some drops | very good |
| 100 | rotation and spattering of drops starting from 300 mm | very good |
| 125 | poor | beginning of flow pulsations |

The liquid flow is very good when stabilizing yarns are used, whatever the flow rates. The lack of stabilizing yarns causes the rotation of the flow and the rupturing of the liquid sheath in the form of spattering drops with flow rates in the order of 76 ml/min.

Texturing gives threads a certain bulkiness which is particularly advantageous for the flow. In fact, it has been noted that for relatively low flow rates, the liquid sheath flowing along the yarn is thinner than when using cabled threads. This effect may be explained by the flow of a large part of the liquid in the midst of the multi-filamented yarn.

EXAMPLE 4

A cabled thread made with polyhexamethylene adipamide of 940 dtex × 6 × 3 and obtained by assembling with an S-twist of 250 turns per meter and by cabling with a Z-twist of 125 turns per meter is lapped to a stabilizing yarn made from a twisted thread of polyhexamethylene adipamide with an S-twist of 840 turns per meter by winding the stabilizing yarn around the supporting yarn in the direction contrary to Z-twist, forming five turns per meter.

Flow tests are made on 9.25 meters of yarn subjected to a tension resulting from a load of 60 grams. The flow rate is progressively increased up to 105 ml of demineralized water per minute.

The liquid sheath is not ruptured although without a stabilizing yarn, the liquid becomes disconnected after only 25 centimeters of run with flow rates in the order of 50 ml per minute.

EXAMPLE 5

Using the procedure of Example 4, a second similar stabilizing yarn is added to the supporting yarn. The liquid flow remains stable along the entire length of this composite cabled thread containing no breakup of the liquid sheath.

EXAMPLE 6

Utilizing the procedure of Example 4, the stabilizing yarn is wound around the supporting yarn for the first 5 meters of the yarn only. When liquid flows over this yarn, the liquid sheath is stable for the first 5 meters, however, the sheath breaks up while passing over the unstabilized support yarn, causing rupturing of the liquid sheath.

EXAMPLE 7

Again, utilizing the procedure of Example 4, the support yarn and stabilizing yarn are twisted over the first 5 meters of the yarn at a Z twist of 5 turns per meter and the second 5 meters is twisted at 250 S turns per meter. At the point of twist change, the liquid sheath becomes instable and rupture results.

Examples 4 through 7 show that by changing the twisting or by partially eliminating the stabilizing yarn over a portion of a support yarn, various flow characteristics can be achieved.

Example 8

A 1 meter wide bundle of multi-filaments yarns is made from polyhexamethylene adipamide threads which are 1 meter long. Each of the polyhexamethylene adipamide yarns is made up of 1000 filaments to form a 5000 denier thread and has a final twist of about 10 turns per meter. These yarns are spaced 7.5 mm. apart and the ends of these yarns are held in a thermoplastic synthetic resin strip 5.5 mm thick separated by 2 mm wide inserts so that the length is slightly greather than the width of the yarn sheet.

In this way, sheets of multi-filamented parallel threads are obtained, the surface of which is 1 square meter. By assembling a series of identical yarn sheets, made up as described above, a bundle of one cubic meter is set up in which each yarn is 7.5 millimeters away from its neighbor in two perpendicular directions. The assembly of juxtaposed strips forms a fastening plate at both ends of the yarn bundle. The number of parallel yarns per square meter is 1,000/7.5 × 1,000/7.5 = 17,800 yarns.

With a useful yarn length of 1 meter and a contacting device having a volume of 1 cubic meter, the weight of the threads is 10 kilograms and the volume of the useful yarn is 0.009 $m^3$ per $m^3$. These are particularly small values compared to those of a conventional column packed with half-inch Raschig rings, i.e., propylene rings weigh 150 $kg/m^3$; ceramic ones, 700 $kg/m^3$; and stainless steel ones, 900 $kg/m^3$. The relatively high weight of these conventional packings necessarily increase costs. These conventional rings are from 25 to 250 times more expensive than the 10 kilograms of polyamide yarns required per cubic meter.

One cubic meter thread bundles are introduced under low pressure into a contactor, the volume of which is slightly greater than that as shown in FIG. 10. The distributing compartment of the liquid flow is fed continuously with pure water at a temperature of 20°C.

Polyamide multi-filamented threads, in contact with the distributing compartment, make up a guide and a braking element for the water flowing continuously by gravity in the form of regular and uniform liquid sheaths. The diameter of liquid sheaths thus formed is in the order of 2 millimeters and the total surface exposed, per cubic meter is 17,800 × pi × 0.002, i.e., 112 square meters of exposed surface per cubic meter.

This value is particularly advantageous and compares favorably with average useful surfaces exposed to transfer in columns packed with Raschig rings. The corresponding liquid flow rate is about 2.4 litres per hour for one thread, which means a total flow rate of 17,800 × 2.4 = 42,720 litres per hour per cubic meter of contactor volume. The liquid retention on the yarn bundle is approximately 45 litres per cubic meter for a flow rate of about 43$m^3$/h.

In the case of a column packed with Raschig rings of the conventional type, the liquid retention for a practically identical flow rate is 140 litres per cubic meter near the loading point. The yarn bundles of this invention have a particularly low liquid retention, on the average one third that of existing devices, which gives a maximum regulation flexibility and particularly short response times. Besides, this low retention makes it possible to clean the support and achieve an important saving on cleaning solutions for the apparatus.

While pure water liquid sheaths flow along every thread of the bundle a gas is introduced into the apparatus at a velocity of 2 meters per second. This gas meets the thread bundle in a perpendicular direction and sustains, while passing on the thread bundle, a pressure drop of less than 5 centimeters of water. This figure is particularly low compared with the load loss of 30 centimeters of water per meter of gas run registered in a packed column of ½ inch Raschig rings near the "loading" point. This particularly small pressure drop of gaseous fluid is one of the advantages of the apparatus using of multi-filamented thread bundles.

The porosity of the system, that is to say the free passage for the gas in the case of a total flow rate of 43 m³/hr, is about 95 percent in the process based on the use of multi-filamented yarn bundles. At the same flow rate, the porosities of a column packed with ceramic or stainless steel Raschig rings are, respectively, only 50 percent and 75 percent.

Ammonia, carbon dioxide and chlorine mixed with air were chosen as exchange gases. For given liquid (water) and gas flow rates it was possible to obtain particularly high transfer coefficients when these various gases were absorbed in the water flowing in the form of liquid sheaths along multi-filamented threads.

EXAMPLE 9

Using the conditions of Example 1 for the preparation of bundles, and using the sheets described in Example 8, the total flow rate of the liquid (pure water) is varied within the limits given in Table 4. For each flow rate the diameter of liquid sheaths, the total exposed surface and the liquid retention on yarns are measured.

TABLE 4

| Flow rate per yarn (cm³/min) | Total flow rate (m³/hr) | Average diameter of individual liquid sheaths (mm) | Liquid surface exposed to contact with gas (m²/m³) |
| --- | --- | --- | --- |
| 5 | 5.35 | 1.22 | 68 |
| 10 | 10.7 | 1.50 | 84 |
| 20 | 21.5 | 1.65 | 91 |
| 40 | 43 | 2.03 | 114 |

A mixture of air and $CO_2$ is chosen as gaseous fluid striking thread bundles perpendicularly at a velocity of 2 m/sec. Within the limits of the total flow rate of the liquid fluid, from 3 m³ to 50 m³, liquid sheaths flow continuously along yarns and no disruption of flow is noted under the conditions of treatment.

When the gas velocity is brought to 4, 6 and 8 m/sec, vibrations of supporting yarns are noted for small liquid flow rates and for tensions lower than 30 grams. In the case of large liquid flow rates (more than 40 cm³/min per yarn) disruptions are noted in the feed and flow of the liquid.

EXAMPLE 10

Using the multi-filamented thread bundles were prepared as in Examples 1 to 4, the total flow rate of the liquid flowing along each of the multi-filmented yarn is varied from 10 to 125 cm³/min. Air is chosen as the gaseous fluid striking the thread bundles perpendicularly at a velocity of 2 to 4 m/sec. Whatever liquid flow rates are applied, the liquid sheaths flowing along every multi-filamented yarns are individualized and steady. Thermal exhanges between liquid and gaseous phases are particularly favorable and rapid. This type of contactor is useful as an air humidifier or a water oxygenizer.

EXAMPLE 11

Tests are made with various threads having different characteristics as shown in Table 5. The aim is to extract $CO_2$ from mixtures of air and $CO_2$ using various liquids: aqueous solutions of $K_2CO_3$, methanol and water.

TABLE 5

| Thread type | Thread No. or fiber gaugements den. | No. of fila- ments | No. of threads used | Total gauge den. | Special Characteristics |
| --- | --- | --- | --- | --- | --- |
| Poly (ε-cap-rolactam) | 840 | 136 | 4 | 3,360 | |
| " | 3,375 | 210 | 1 | 3,375 | textured |
| " | 5,040 | 816 | 1 | 5,040 | high strength |
| " | 520 | 34 | 4 | 2,080 | multi-lobed |
| poly propyl. | 3,750 | 280 | 1 | 3,750 | |
| " | 3,700 | — | fibers 15 to 20 deniers | 3,700 | fibrilled |
| polyethylene | 2,000 | 112 | 2 | 4,000 | |
| PET | 1,300 | 210 | 4 | 5,200 | high strength |
| " | 15 | — | — | 3,000 | spun |
| polyacrylonitril | 15 | — | — | 3,000 | spun |
| polytetrafluoroethylene | 1,200 | 180 | 2 | 2,400 | |
| glass (x) | 2,050 | 2,040 | — | 2,050 | |

(x) Not used with $K_2CO_3$ solutions

The characteristics of the liquid flow, i.e., flow rate, velocity, diameter, form are controlled by the characteristics of the dispenser, the feed pressure, the thread tension and the interactions caused by tangential tensions and created at the solid-liquid surfaces. They are influenced by the surface condition of the yarns, which among other things, depends on the type of yarn used, on treatments received and on the assembling method adopted for the preparation of multi-filamented threads.

In all cases, the transfer surfaces obtained are very larged compared with those of previous processes, for the same weight. The weights and volumes of thread bundles are dozens of times smaller than those of Raschig or similar packings in conventional columns, for the same transfer performance.

EXAMPLE 12

Yarn bundles described in Example 1 were reproduced and applied to various flowing liquids and gaseous fluids or one behaving as such as shown in Table 6.

TABLE 6

| Flowing liquid | Gaseous fluid | Type of Operation |
| --- | --- | --- |
| $H_2SO_4$ at 10% | $NH_3$ air | Absorption |
| NaOH at 8% | $H_2S$ air | " |
| " | Residual gas from viscose spinning ($H_2S$-$CS_2$) | " |
| Benzene | Air | Evaporation, carburation |
| $CH_3OH$ | Air | Evaporation |
| Aqueous solution $K_2CO_3$ | $CO_2$ air | Absorption |
| NaOH at 8% | $CO_2$ air | Reaction |
| Glycol ethylene | Water vapour in air | Drying |
| Water | Air charged with acetone | Absorption |
| Paper mill residual waters | Air or oxygen air | Absorption |
| Water | Air charged with dust from limestone crusher | Dedusting |
| $H_2O$ | Air dimethyl-formamide | Absorption |

All the above-mentioned treatments are carried out under very good conditions. In every case, the stability of the liquid sheaths is maintained. The exchange efficience is excellent, whatever treatment fluids are used.

The process and device which are the subject of this invention have many industrial applications, in addition to the examples given above, such as: absorption of gas or various compounds in a vaporous state in water, aqueous solutions, liquid hydrocarbons, alcohols, organic solvents, alkaline lyes, acids, etc.; reaction of gases or vapours with various liquids; oxygenation of residual or other waters; desorption of a compound dissolved in a liquid, perhaps in combination with a drop in the total pressure, a temperature rise or some other physicochemical means; qualitative and controlled evaporation of liquids for producing gas-steam mixtures to be used, for example, to feed reactors; evaporation of liquids in order to concentrate solutions; condensation of vapours contained in a gaseous current through contact with a cold liquid i.e., to dry gases; liquid-steam exchanges in a rectifying operation; and gas dedusting and demisting.

Although the process and apparatus of the present invention have been described by way of the forgoing specific illustrations and examples there are to in no way limiting the scope of the present invention which is defined by the following appended claims.

I claim:

1. A process for contacting at least two fluids and for transferring materials and heat comprising:
   1. delivering at least one liquid to one end of a series of multi-filament yarns arranged in at least one bundle at such a rate that said liquid flows over each of said threads as a liquid sheath, said yarns being separated from each other so that said liquid sheaths maintain individuality over a substantial portion of the length of said yarns; and
   2. passing at least one additional fluid over said liquid sheaths.

2. The process of claim 1 wherein said rate of flow is substantially continuous.

3. The process of claim 1 wherein said flow of each liquid sheath is caused by centrifugal force.

4. The process of claim 1 wherein said mutli-filament yarns are under tension.

5. The process of claim 1 wherein said multi-filament yarns are parallel to each other.

6. The process of claim 1 wherein said bundles of multi-filament yarns are regularly spaced.

7. The process of claim 1 wherein said multi-filament yarns are vibrated.

8. The process of claim 1 wherein said multi-filament yarns are subjected to electrical fields.

9. The process of claim 1 wherein said multi-filament yarns include heat conductive elements.

10. The process of claim 1 wherein said series of multi-filament yarns is an assembly of sheets of said yarns, said yarns being spaced in relation to each other and the ends of said yarns being fastened to strips having a length corresponding to at least the length of said sheet and a thickness corresponding at most to the spacing provided between said yarns to avoid contact between neighboring liquid sheaths.

11. The process of claim 1 wherein said liquid flowing as said liquid sheath is selected from water, organic compounds, solvents, aqueous solutions, solutions of minerals in solvent or solutions of organic compounds in a solvent.

12. The process of claim 1 wherein said additional fluid is a continuous phase and is selected from gases, vapors, mists or solid particles suspended in a gas.

13. The process of claim 1 wherein said additional fluid passes substantially parallel to and co-currently with said liquid sheath.

14. The process of claim 1 wherein said additional fluid passes substantially parallel and counter-currently to said liquid sheath.

15. The process of claim 1 wherein said additional fluid passes across the flow of said liquid sheath.

16. The process of claim 1 wherein said multi-filament yarns comprise a twisted support yarn and at least one stabilizing yarn.

17. The process of claim 16 wherein said support yarn and said stabilizing yarn are assembled in a side by side relationship.

18. The process of claim 16 wherein said support yarn and said stabilizing yarn are assembled by lapping.

19. The process of claim 16 wherein the twist of said support yarn and said stabilizing yarn is varied along the length of said yarns.

20. The process of claim 16 wherein said stabilizing yarn has parallel filaments.

21. The process of claim 16 wherein the said stabilizing yarn has twisted filaments.

22. The process of claim 16 wherein said stabilizing yarn has cabled filaments.

23. the process of claim 16 wherein said multi-filament yarns are under tension.

24. The process of claim 16 wherein said multi-filament yarns are parallel to each other.

25. The process of claim 16 wherein said bundles of multi-filament yarns are regularly spaced.

26. The process of claim 16 wherein said multi-filament yarns are vibrated.

27. The process of claim 16 wherein said multi-filament yarns are subjected to electrical fields.

28. The process of claim 16 wherein said multi-filament yarns include heat conductive elements.

29. The process of claim 16 wherein said series of multi-filament yarns is an assembly of sheets of said yarns, said yarns being spaced in relation to each other and the ends of said yarns being fastened to strips having a length corresponding to at least the length of said sheet and a thickness corresponding at most to the spacing provided between said yarns to avoid contact between neighboring liquid sheaths.

30. The process of claim 16 wherein said liquid flowing as said liquid sheath is selected from water, organic compounds, solvents, aqueous solutions, solutions of minerals in solvent or solutions of organic compounds in a solvent.

31. The process of claim 16 wherein said additional fluid is a continuous phase and is selected from gases, vapors, mists or solid particles suspended in a gas.

32. The process of claim 16 wherein said additional fluid passes substantially parallel to and co-currently with said liquid sheath.

33. The process of claim 16 wherein said additional fluid passes substantially parallel and counter-currently to said liquid sheath.

34. The process of claim 16 wherein said additional fluid passes across the flow of said liquid sheath.

35. The process of claim 16 wherein said support yarn and said stabilizing yarn are twisted so that said liquid sheaths rupture after said sheaths have flowed over a substantial portion of the length of said threads.

36. The process of claim 35 wherein the twist of said support yarn and said stabilizing yarn is varied along the length of said yarns.

37. The process of claim 35 wherein said multi-filament yarns are parallel to each other.

38. The process of claim 35 wherein said bundles of multi-filament yarns are regularly spaced.

39. The process of claim 35 wherein said multi-filament yarns are vibrated.

40. The process of claim 16 wherein said support yarn and said stabilizing yarn are assembled with a slight twist.

41. The process of claim 40 wherein said support yarn and said stabilizing yarn are joined with a twist within the range of from 0 to 25 turns per meter in a direction opposite the final twist of said support yarn.

42. The process of claim 40 wherein said multi-filament yarns are parallel to each other.

43. The process of claim 40 wherein said bundles of multi-filament yarns are regularly spaced.

44. The process of claim 40 wherein said multi-filament yarns are vibrated.

45. The process of claim 40 wherein said support yarn and said stabilizing yarn are joined with a twist within the range of from 0 to 100 turns per meter in a direction opposite the final twist of said support yarn.

46. The process of claim 45 wherein said bundles of multi-filament yarns are regularly spaced.

47. The process of claim 45 wherein said multi-filament yarns are vibrated.

48. The process of claim 45 wherein said multi-filament yarns are parallel to each other.

49. The process of claim 48 wherein said multi-filament yarns are vibrated.

50. The process of claim 48 wherein said bundles of multi-filament yarns are regularly spaced.

51. The process of claim 50 wherein said multi-filament yarns are vibrated.

52. The process of claim 51 wherein said multi-filament yarns are subjected to electrical fields.

53. The process of claim 52 wherein said multi-filament yarns include heat conductive elements.

54. The process of claim 53 wherein said series of multi-filament yarns is an assembly of sheets of said yarns, said yarns being spaced in relation to each other and the ends of said yarns being fastened to strips having a length corresponding to at least the length of said sheet and a thickness corresponding at most to the spacing provided between said yarns to avoid contact between neighboring liquid sheaths.

55. The process of claim 54 wherein said liquid flowing as said liquid sheath is selected from water, organic compounds, solvents, aqueous solutions, solutions of minerals in solvent or solutions of organic compounds in a solvent.

56. The process of claim 55 wherein said additional fluid is a continuous phase and is selected from gases, vapors, mists or solid particles suspended in a gas.

57. The process of claim 56 wherein said additional fluid passes substantially parallel to and co-currently with said liquid sheath.

58. The process of claim 56 wherein said additional fluid passes substantially parallel and counter-currently to said liquid sheath.

59. The process of claim 56 wherein said additional fluid passes across the flow of said liquid sheath.

60. Apparatus for contacting at least one liquid and at least one fluid in a continuous phase for transferring heat and matter between said liquid and said fluid comprising: a series of multi-filament yarns; means for distributing said liquid to said yarns; means for evacuating said liquid from said yarns; means for fastening the ends of said yarns in contact with said distributing and said evacuating means; and means for distributing and evacuating said continuous phase fluid so that said fluid contacts said liquid on said yarns said distributing means comprising a distributing compartment and an assembly of strips having passages so that the liquid can flow to said yarns, the ends of said yarns being fastened to said strips, and said evacuating means comprising an evacuating chamber and an assembly of strips having the ends of said yarns fastened thereto and having passages for said liquid to flow from said yarns to said chamber.

61. The apparatus of claim 60 wherein said strips have regularly spaced channels.

62. The apparatus of claim 60 wherein said strips are porous.

63. The apparatus of claim 60 wherein said yarn ends include porous material.

64. The apparatus of claim 60 wherein said strips have a length corresponding at least to the width of a sheet of said yarns and a thickness corresponding at most to the space provided between the yarns to prevent contact of said liquid flowing on said yarns.

65. The apparatus of claim 60 wherein said strips comprise one wall of said distributing compartment.

66. The apparatus of claim 60 wherein said strips have inserts between said strips to provide channels for said liquid.

67. The apparatus of claim 66 wherein said inserts are porous.

68. The apparatus of claim 66 wherein the thickness of said strip and said insert corresponds to the spacing provided between the yarns to avoid contacts of said liquid flowing on said yarns.

69. The apparatus of claim 66 wherein said strips and said inserts comprise one wall of said distributing compartment.

* * * * *